United States Patent
Jiao

(10) Patent No.: US 11,088,773 B1
(45) Date of Patent: Aug. 10, 2021

(54) METHOD FOR ORTHOGONAL WAVICLE DIVISION MULTIPLE-ACCESS MODULATION-DEMODULATION

(71) Applicant: Yanhua Jiao, Beijing (CN)

(72) Inventor: Yanhua Jiao, Beijing (CN)

(*) Notice: Subject to any disclaimer, the term of this patent is extended or adjusted under 35 U.S.C. 154(b) by 0 days.

(21) Appl. No.: 17/095,757

(22) Filed: Nov. 12, 2020

Related U.S. Application Data

(63) Continuation-in-part of application No. PCT/CN2020/117558, filed on Sep. 24, 2020.

(51) Int. Cl.
 *H04J 14/02* (2006.01)
 *H04L 7/00* (2006.01)
 *H04B 10/70* (2013.01)

(52) U.S. Cl.
 CPC .............. *H04J 14/02* (2013.01); *H04B 10/70* (2013.01); *H04L 7/0075* (2013.01)

(58) Field of Classification Search
 CPC .......... H04J 14/02; H04J 13/004; H04J 13/12; H04J 11/00; H04J 2011/0003; H04B 10/70; H04L 7/0075; H04L 5/0008; H04L 9/001; H04L 9/0852; H04L 9/0855; G06N 10/00
 USPC ..................... 398/89, 79, 183, 141, 132, 140
 See application file for complete search history.

(56) References Cited

U.S. PATENT DOCUMENTS

| | | | | |
|---|---|---|---|---|
| 10,802,800 B1 * | 10/2020 | Vakili | ..................... | H04L 9/083 |
| 10,855,457 B1 * | 12/2020 | Vakili | ................... | H04L 9/0858 |
| 2002/0181388 A1 * | 12/2002 | Jain | ..................... | H04L 27/0004 370/208 |
| 2014/0233442 A1 * | 8/2014 | Atias | ................. | H04W 52/0251 370/311 |

FOREIGN PATENT DOCUMENTS

WO   WO-2019174031 A1 * 9/2019 ............. H04L 9/001

* cited by examiner

*Primary Examiner* — Hibret A Woldekidan
(74) *Attorney, Agent, or Firm* — Bayramoglu Law Offices LLC

(57) ABSTRACT

A method for orthogonal wavicle division multiple-access modulation-demodulation includes: generate an orthogonal quantum chaotic data wavicles matrix and a quantum chaotic sync wavicle according to a key including the required data bit-rate, the parallel symbols transmission scheme, the signal updating/sampling rate, the available energy spectrum range, and either the ID of the source user or other perturbation schemes agreed upon by the transmitter and receiver; generate and transmit a modulated quantum chaotic wavicle by orthogonal wavicle division multiplexing modulating a serial bits segment to an orthogonal quantum chaotic data wavicles matrix plus a quantum chaotic sync wavicle; and retrieve the serial bits segment by orthogonal wavicle division multiplexing demodulating the received signal synchronously with an orthogonal quantum chaotic data wavicles matrix plus a quantum chaotic sync wavicle.

12 Claims, 2 Drawing Sheets

METHOD FOR ORTHOGONAL WAVICLE DIVISION MULTIPLE-ACCESS MODULATION-DEMODULATION

CROSS REFERENCE TO THE RELATED APPLICATIONS

This application is a continuation-in-part application of International Application No. PCT/CN2020/117558, filed on Sep. 24, 2020.

TECHNICAL FIELD

The invention relates to radio communication, especially a method for Orthogonal Wavicle Division Multiple-Access modulation-demodulation.

BACKGROUND

As a key progression from the Internet of Things (IoT) to the Internet of Everything (IoE), massive machine type communication (mMTC) is a type of communication between machines over wired or wireless networks where data generation, information exchange and actuation take place with minimal or no intervention from humans. On account of its core role in the information society, mMTC should be provided a much better physical layer solution than the prevailing LPWAN, such as RoLa, Sigfox, and so on. That is, a new physical layer solution should have absolute confidentiality and high bit-rate, ultra-high reliability and ultra-low latency, extremely high flexibility and infinite multiple-access capability, low power and long range, etc. for an open mMTC network.

SUMMARY

In order to invent an excellent Orthogonal Multiple-Access (OMA) method that not only overcomes the disadvantages and retains the advantages of the predominant Code Division Multiple-Access (CDMA) and Orthogonal Frequency Division Multiplexing (OFDM), but also shows other advantages in some aspects, such as multiple-access capability, confidentiality, latency, energy efficiency, etc. an Orthogonal Wavicle Division Multiple-Access (OWDMA) modulation-demodulation method is disclosed in the invention. By combining the quantum chaotic transition theory and the classical software-defined radio (SDR) technique, a set of semiclassical orthogonal quantum chaotic wavicles with infinite Multiple-Access (MA) capability are generated to optimize the use of the same available spectrum simultaneously over a geographical area by massive users.

A method for OWDMA modulation-demodulation in the invention comprises the following processes:
Process one: procedure one, determine the scale of the orthogonal quantum chaotic wavicles by the required data bit-rate, the parallel symbols transmission scheme and the signal updating/sampling rate; procedure two, determine the quantum chaotic transition range coefficient by the available energy spectrum minimum and maximum ranges of the orthogonal quantum chaotic wavicles; procedure three, generate a Hermitian matrix operator for a bounded and isolated quantum system; procedure four, generate a Hermitian perturbation matrix by the ID of the source user or other perturbation schemes agreed upon by the transmitter and receiver; procedure five, calculate all the orthonormal stationary quantum chaotic states of the bounded and isolated quantum system after the external perturbation numerically; procedure six, generate a set of orthogonal quantum chaotic wavicles by direct selection or linear superposition; procedure seven, generate an orthogonal quantum chaotic data wavicles matrix plus a quantum chaotic sync wavicle.

Process two: procedure one, generate a parallel symbols array by Serial-Parallel (S-P) conversion of a serial bits segment; procedure two, map each parallel symbol in the symbols array to one quantum chaotic data wavicle in the quantum chaotic data wavicles matrix by row; procedure three, generate a modulated quantum chaotic wavicle by accumulating all the parallel mapped quantum chaotic data wavicles and the quantum chaotic sync wavicle; procedure four, transmit a modulated quantum chaotic wavicle completely following or partly overlapping with and overdue to the previous one.

Process three: procedure one, sliding dot-product the received signal by the quantum chaotic sync wavicle to obtain the correlation synchronizing values array; procedure two, detect and synchronize the quantum chaotic sync wavicle in the received signal by comparing the maximum correlation synchronizing value with a sync detection threshold; procedure three, dot-product the synchronized signal by the quantum chaotic data wavicles matrix to obtain the correlation receiving values matrix; procedure four, extract a parallel symbols array from the correlation receiving values matrix by seeking out the index of the maximum value per row; procedure five, retrieve a serial bits segment by Parallel-Serial (P-S) conversion of the parallel symbols array.

In any of the above technical solutions, it is preferred that the scale $N_w$ of the orthogonal quantum chaotic wavicles has the following mathematical expression $$N_w = \frac{m \cdot P \cdot R_s}{R_b}$$

wherein $R_b$ is the required data bit-rate, $R_s$ is the signal updating/sampling rate, P is the number of parallel symbols and m is the bit number per symbol.

In any of the above technical solutions, it is preferred that the quantum chaotic transition range coefficient a has the following mathematical expression $$a = \frac{1}{2}\frac{f_L}{f_H}$$

wherein $f_L$ and $f_H$ are the available energy spectrum minimum and maximum ranges of the orthogonal quantum chaotic wavicles, respectively.

In any of the above technical solutions, it is preferred that an $N_w \times N_w$ Hermitian matrix operator H for a bounded and isolated quantum system has the following mathematical expression $$H = -Sa^2[a(j-k)], 1 \leq j, k \leq N_w$$

wherein $N_w$ is the scale of the orthogonal quantum chaotic wavicles and a is the quantum chaotic transition range coefficient.

In any of the above technical solutions, it is preferred that all the orthonormal stationary quantum chaotic states $\{\varphi_k', 2aN_w \leq k \leq N_w\}$ of the bounded and isolated quantum system H after the external perturbation δ is numerically calculate by the Divide and Conquer Method, the Jacobian Method, and so on.

$$(H+\delta)\varphi_k' = E_k'\varphi_k'$$

wherein $E_k'$ is the eigenvalue corresponding to $\varphi_k'$.

In any of the above technical solutions, it is preferred that the number nW of the orthogonal quantum chaotic wavicles linearly superposed or directly selected from the above orthonormal stationary quantum chaotic states $\{\varphi_k', 2aN_w\text{-} \leq k \leq N_W\}$ has the following mathematical expression $$nW = 2^m \cdot P + 1$$

wherein P is the number of parallel symbols and m is the bit number per symbol.

In any of the above technical solutions, it is preferred that the modulated quantum chaotic wavicle $W^t$ accumulated all the parallel mapped quantum chaotic data wavicles $W_p$ and the quantum chaotic sync wavicle $W_0$ has the following mathematical expression $$W^t = W_0 + \sum_p W_p$$

In any of the above technical solutions, it is preferred that the correlation synchronizing values array $\chi$ obtained by sliding dot-product the received signal $s_r$ by the quantum chaotic sync wavicle $W_0$ has the following mathematical expression $$\chi(k) = \sum_n s_r(n+k) W_0(n)$$

wherein $s_r(n)$ is a received signal segment of the length $2 \cdot N_w$.

In any of the above technical solutions, it is preferred that the correlation receiving values matrix $\lambda$ obtained by dot-product the synchronized signal $s_w$ by the quantum chaotic data wavicles matrix W has the following mathematical expression $$\lambda_{p,j} = \sum_n s_w(n) W_{p,j}(n), 1 \leq p \leq P; 1 \leq j \leq 2^m$$

wherein P is the number of parallel symbols and m is the bit number per symbol.

The method for OWDMA modulation-demodulation is an orthogonal multi-carrier modulation-demodulation method with infinite multiple-access capability by adopting an orthogonal quantum chaotic data wavicles matrix plus a quantum chaotic sync wavicle as carriers for information bits, and has been practiced and verified by eBat3000 quantum chaotic SDR system by Quantum Chaos Technology (Beijing) Co. Ltd. OWDMA not only overcomes the disadvantages and retains the advantages of the predominant CDMA and OFDM, but also shows more amazing abilities in some aspects, such as multiple-access capability, confidentiality, reliability, latency, power, flexibility, and so on, and can provide a physical layer solution with absolute confidentiality and high bit-rate, ultra-high reliability and ultra-low latency, extremely high flexibility and infinite multiple-access capability, low power and long range, etc. for an open mMTC network.

DETAILED DESCRIPTION OF THE EMBODIMENTS

The present invention is further elaborated in accordance with the drawings and embodiments.

Embodiment 1

Figure 1:
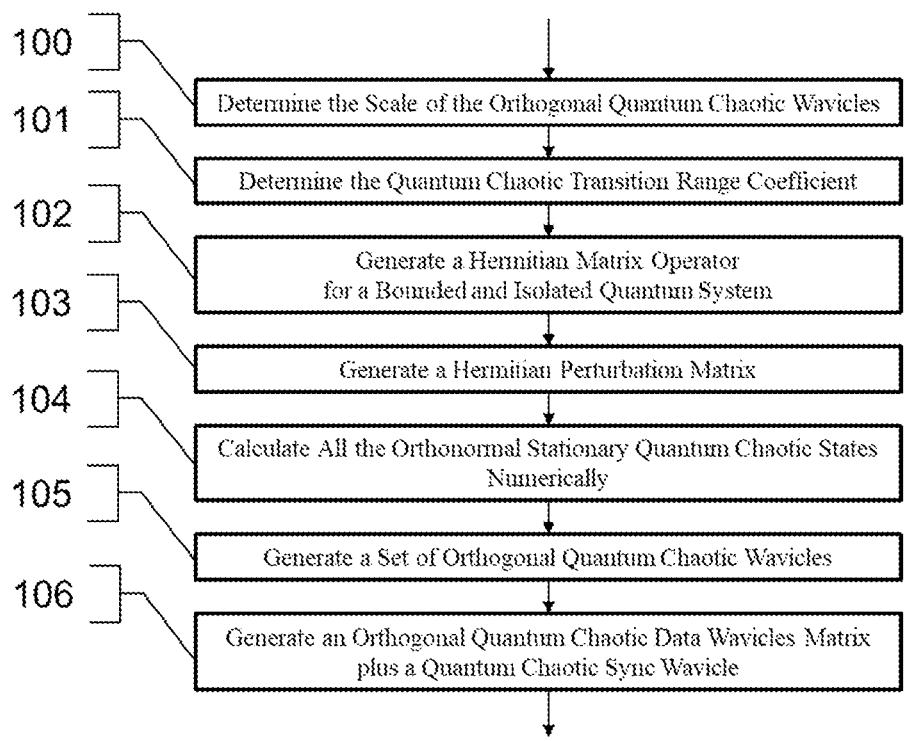
FIG. 1 is a flow chart of generating an orthogonal quantum chaotic data wavicles matrix plus a quantum chaotic sync wavicle according to a preferred embodiment of the invention.

By numerical calculation of all the orthonormal stationary quantum chaotic states of a certain bounded and isolated quantum system after a specific external perturbation, an orthogonal quantum chaotic data wavicles matrix plus a quantum chaotic sync wavicle are generated in transmitter and receiver simultaneously through the following procedures shown in FIG. 1.

Executing procedure 100: determine the scale $N_w$ of the orthogonal quantum chaotic wavicles by the required data bit-rate $R_b$, the P parallel m-bit symbols transmission scheme and the signal updating/sampling rate $R_s$, $$N_w = \frac{m \cdot P \cdot R_s}{R_b}$$

Executing procedure 101: determine the quantum chaotic transition range coefficient a by the available energy spectrum range $(f_L, f_H)$ of the orthogonal quantum chaotic wavicles, $$a = \frac{1}{2} \frac{f_L}{f_H}$$

Executing procedure 102: generate a $N_w \times N_w$ Hermitian matrix operator H for a bounded and isolated quantum system by the above scale $N_w$ and quantum chaotic transition range coefficient a $$H = -Sa^2[a(j-k)], 1 \leq j, k \leq N_w$$

Executing procedure 103: generate a $N_w \times N_w$ Hermitian perturbation matrix $\delta$ by the ID of the source user or other perturbation schemes agreed upon by the transmitter and receiver.

Executing procedure 104: numerically calculate all the orthonormal stationary quantum chaotic states $\{\varphi_k', 2aN_w\text{-} \leq k \leq N_W\}$ of the bounded and isolated quantum system H after the external perturbation $\delta$ by the Divide and Conquer Method, the Jacobian Method, and so on.

$$(H+\delta)\varphi_k' = E_k'\varphi_k'$$

wherein the $E_k'$ is the eigenvalue corresponding to $\varphi_k'$.

Executing procedure 105: generate a set of nW orthogonal quantum chaotic wavicles from the above orthonormal stationary quantum chaotic states $\{\varphi_k' 2aN_w \le k \le N_w\}$ by direct selection or linear superposition $$nW = 2^m \cdot P + 1$$

wherein P is the number of parallel symbols and m is the bit number per symbol.

Executing procedure 106: generate a P×2$^m$ orthogonal quantum chaotic data wavicles matrix W and a quantum chaotic sync wavicle $W_0$ from the above set of nW orthogonal quantum chaotic wavicles Embodiment 2

Figure 2:
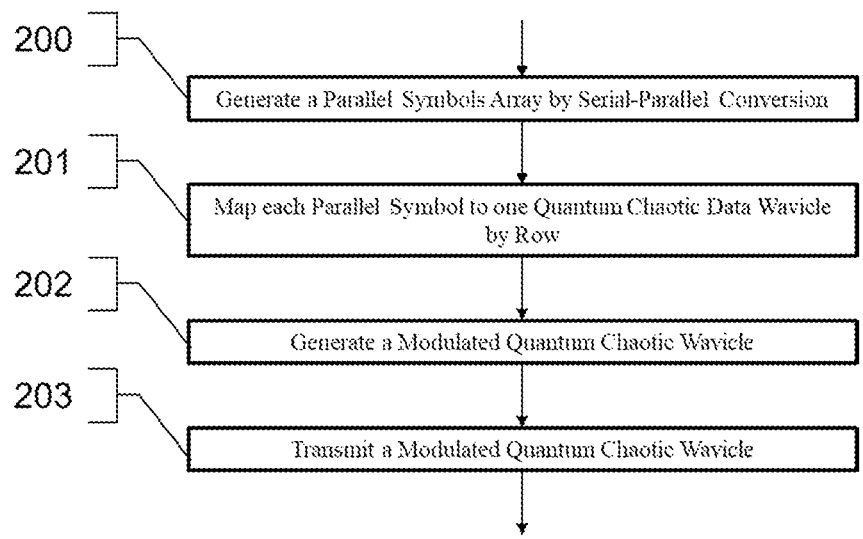
FIG. 2 is a flow chart of Orthogonal Wavicle Division Multiplexing modulation according to a preferred embodiment of the invention.

By mapping each parallel symbol in the symbols array to one orthogonal quantum chaotic data wavicle in the orthogonal quantum chaotic data wavicles matrix by row, a modulated quantum chaotic wavicle is generated and transmitted in transmitter through the following procedures shown in FIG. 2.

Executing procedure 200: generate a parallel m-bit symbols P×1 array $D^t$ by Serial-Parallel (S-P) conversion of a serial m·P bits segment; Executing procedure 201: map each parallel symbol $D_p^t$ in the symbol array $D^t$ to one quantum chaotic data wavicle $W_{p,D_p^t+1}$ in the quantum chaotic data wavicles matrix W by row;

Executing procedure 202: generate a modulated quantum chaotic wavicle $W^t$ by accumulating all the P parallel mapped quantum chaotic data wavicles $W_{p,D_p^t+1}$ and the quantum chaotic sync wavicle $W_0$;

$$W^t = W_0 + \sum_p W_p$$

Executing procedure 203: transmit a modulated quantum chaotic wavicle completely following or partly overlapping with and overdue to the previous one Embodiment 3

Figure 3:
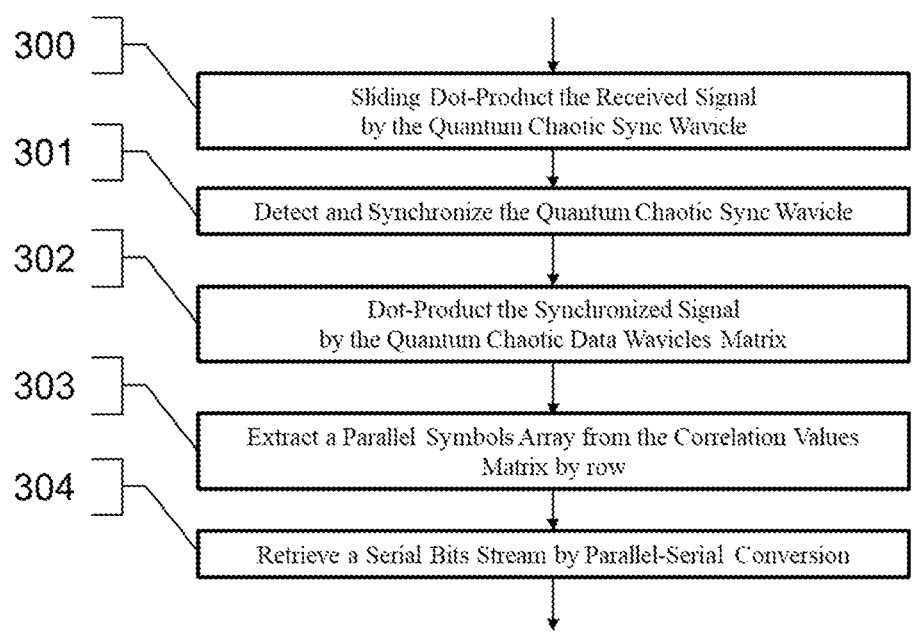
FIG. 3 is a flow chart of Orthogonal Wavicle Division Multiplexing demodulation according to a preferred embodiment of the invention.

After the detection and synchronization of the quantum chaotic sync wavicle, a parallel symbols array is retrieved from the synchronized signal through the following procedures shown in FIG. 3.

Executing procedure 300: calculate the correlation synchronizing values array $\chi$ by sliding dot-product the received signal $s_r$ by the quantum chaotic sync wavicle $W_0$ $$\chi(k) = \sum_n s_r(n+k) W_0(n)$$

wherein $s_r(n)$ is a received signal segment of the length $2 \cdot N_w$.

Executing procedure 301: detect and synchronize the quantum chaotic sync wavicle in the received signal by comparing the maximum synchronization value $\lambda_{max}$ with a sync threshold $\chi_{th}$ to get the synchronized signal $s_w$ from the received signal $s_r(n)$ $$s_w(n) = s_r(k_{max} : k_{max} + N_w - 1)$$

wherein $k_{max}$ is the index of the maximum beyond the sync threshold $\chi_{th}$ in the correlation synchronizing values array $\chi$.

Executing procedure 302: calculate the correlation receiving values matrix $\lambda$ by dot-product the synchronized signal $s_w$ by the quantum chaotic data wavicles matrix W $$\lambda_{p,j} = \sum_n s_w(n) W_{p,j}(n),\ 1 \le p \le P;\ 1 \le j \le 2^m$$

wherein P is the number of parallel symbols and m is the bit number per symbol.

Executing procedure 303: extract a parallel m-bit symbols P×1 array $D^r$ by seeking out the index of the maximum value from the correlation receiving values matrix $\lambda$ by row.

Executing procedure 304: retrieve a serial m·P bits segment by Parallel-Serial conversion of the above parallel m-bit symbols P×1 array $D^r$.

To have a better understanding of the invention, three embodiments are described in detail, but are not a limitation to the invention. According to the technical essence of the invention, any simple modification to the above embodiments should still be within the scope of the invention. Each embodiment in this specification focuses on the differences from other embodiment, which are referred to each other in the same or similar parts.

What is claimed is:

1. A method for orthogonal wavicle division multiple-access modulation-demodulation, comprising:
    generating an orthogonal quantum chaotic data wavicles matrix and a quantum chaotic sync wavicle according to a key comprising a predetermined data bit-rate, a parallel symbols transmission scheme, a signal updating/sampling rate, an available energy spectrum range, and either an ID of a source user or perturbation schemes agreed upon by a transmitter and a receiver;
    generating and transmitting a modulated quantum chaotic wavicle by an orthogonal wavicle division multiplexing modulating a serial bits segment to the orthogonal quantum chaotic data wavicles matrix and the quantum chaotic sync wavicle; and
    retrieving the serial bits segment by the orthogonal wavicle division multiplexing, wherein the orthogonal wavicle division multiplexing demodulates a received signal synchronously with the orthogonal quantum chaotic data wavicles matrix and the quantum chaotic sync wavicle.

2. The method according to claim 1, wherein, a process of generating the orthogonal quantum chaotic data wavicles matrix comprises:
    determining a scale of the orthogonal quantum chaotic wavicles by the predetermined data bit-rate, the parallel symbols transmission scheme and the signal updating/sampling rate;
    determining a quantum chaotic transition range coefficient by the available energy spectrum range of the orthogonal quantum chaotic wavicles;
    generating a Hermitian matrix operator for a bounded and isolated quantum system;
    generating a Hermitian perturbation matrix by the ID of the source user or the perturbation schemes agreed upon by the transmitter and the receiver;
    calculating orthonormal stationary quantum chaotic states of the bounded and isolated quantum system numerically after an external perturbation;
    generating a set of the orthogonal quantum chaotic wavicles by a direct selection or a linear superposition; and
    generating the orthogonal quantum chaotic data wavicles matrix and the quantum chaotic sync wavicle.

3. The method according to claim 2, wherein,
the scale $N_w$ of the orthogonal quantum chaotic wavicles has the following mathematical expression:

$$N_w = \frac{m \cdot P \cdot R_s}{R_b};$$

wherein $R_b$ is the predetermined data bit-rate, $R_s$ is the signal updating/sampling rate, P is a number of parallel symbols, and m is a bit number per symbol.

4. The method according to claim 2, wherein,
the quantum chaotic transition range coefficient a has the following mathematical expression:

$$a = \frac{1}{2}\frac{f_L}{f_H};$$

wherein $f_L$ is a minimum range of the available energy spectrum range, and $f_H$ is a maximum range of the available energy spectrum range of the orthogonal quantum chaotic wavicles.

5. The method according to claim 2, wherein,
a $N_w \times N_w$ Hermitian matrix operator H for the bounded and isolated quantum system has the following mathematical expression:

$$H = -Sa^2[a(j-k)], 1 \leq j, k \leq N_w;$$

wherein $N_w$ is the scale of the orthogonal quantum chaotic wavicles, and a is the quantum chaotic transition range coefficient.

6. The method according to claim 2, wherein,
the orthonormal stationary quantum chaotic states $\{\varphi_k', 2aN_w \leq k \leq N_w\}$ of the bounded and isolated quantum system H after an external perturbation $\delta$ is numerically calculated by a Divide and Conquer method and a Jacobian method:

$$(H+\delta)\varphi_k' = E_k'\varphi_k';$$

wherein $E_k'$ is an eigenvalue corresponding to $\varphi_k'$.

7. The method according to claim 2, wherein, a number nW of the orthogonal quantum chaotic wavicles linearly superposed or directly selected from the orthonormal stationary quantum chaotic states $\{\varphi_k', 2aN_w \leq k \leq N_w\}$ has the following mathematical expression:

$$nW = 2^m \cdot P + 1;$$

wherein P is a number of parallel symbols and m is a bit number per symbol.

8. The method according to claim 1, wherein, a modulating process of the orthogonal wavicle division multiplexing comprises:
generating a parallel symbols array by a serial-parallel conversion of the serial bits segment;
mapping each parallel symbol in the parallel symbols array to one quantum chaotic data wavicle in the orthogonal quantum chaotic data wavicles matrix by row, to obtain parallel mapped quantum chaotic data wavicles;
generating a modulated quantum chaotic wavicle by accumulating the parallel mapped quantum chaotic data wavicles and the quantum chaotic sync wavicle; and
transmitting the modulated quantum chaotic wavicle completely following, or partly overlapping with and overdue to, a previous modulated quantum chaotic wavicle.

9. The method according to claim 8, wherein,
the modulated quantum chaotic wavicle $W^t$ generated by accumulating the parallel mapped quantum chaotic data wavicles $W_p$ and the quantum chaotic sync wavicle $W_0$ has the following mathematical expression:

$$W^t = W_0 + \Sigma_p W_p.$$

10. The method according to claim 1, wherein, a demodulating process of the orthogonal wavicle division multiplexing comprises:
performing a sliding dot-product on the received signal by the quantum chaotic sync wavicle to obtain correlation synchronizing values;
detecting and synchronizing the quantum chaotic sync wavicle in the received signal by comparing a maximum correlation synchronizing value of the correlation synchronizing values with a sync detection threshold, to obtain a synchronized signal;
performing a dot-product on the synchronized signal by the orthogonal quantum chaotic data wavicles matrix to obtain correlation receiving values;
extracting a parallel symbols array from the correlation receiving values by seeking out an index of a maximum value per row; and
retrieving the serial bits segment by a serial-parallel conversion of the parallel symbols array.

11. The method according to claim 10, wherein,
an array $\chi$ of the correlation synchronizing values obtained by performing the sliding dot-product on the received signal $s_r$ by the quantum chaotic sync wavicle $W_0$ has the following mathematical expression:

$$\chi(k) = \Sigma_n s_r(n+k) W_0(n);$$

wherein $s_r(n)$ is a received signal segment of a length $2 \cdot N_w$.

12. The method according to claim 10, wherein,
a matrix $\lambda$ of the correlation receiving values obtained by performing the dot-product on the synchronized signal $s_w$ by the orthogonal quantum chaotic data wavicles matrix W has the following mathematical expression:

$$\lambda_{p,j} = \Sigma_n s_w(n) W_{p,j}(n), \; 1 \leq p \leq P; \; 1 \leq j \leq 2^m;$$

wherein P is a number of parallel symbols and m is a bit number per symbol.

* * * * *